United States Patent Office
2,822,597
Patented Feb. 11, 1958

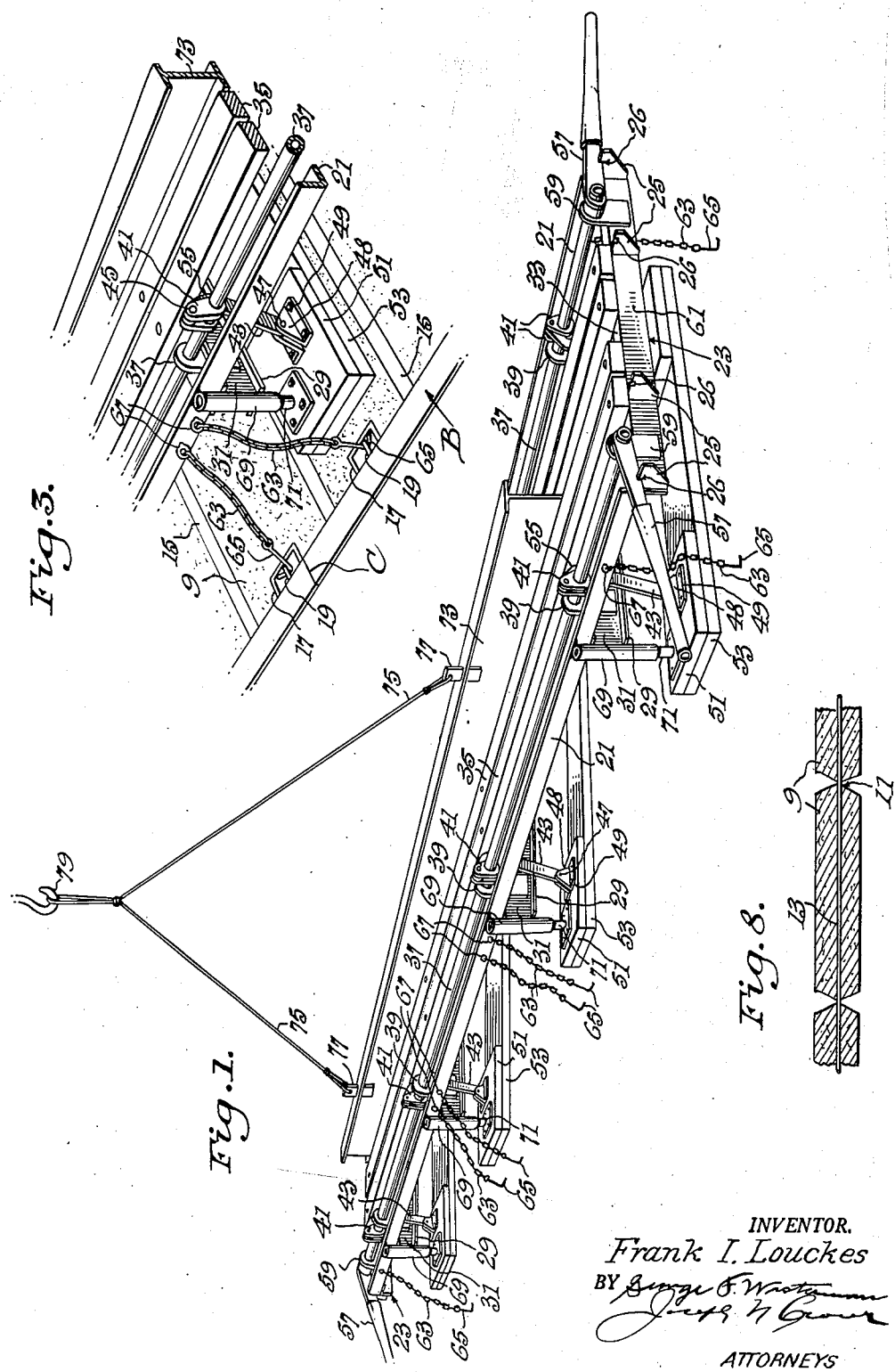

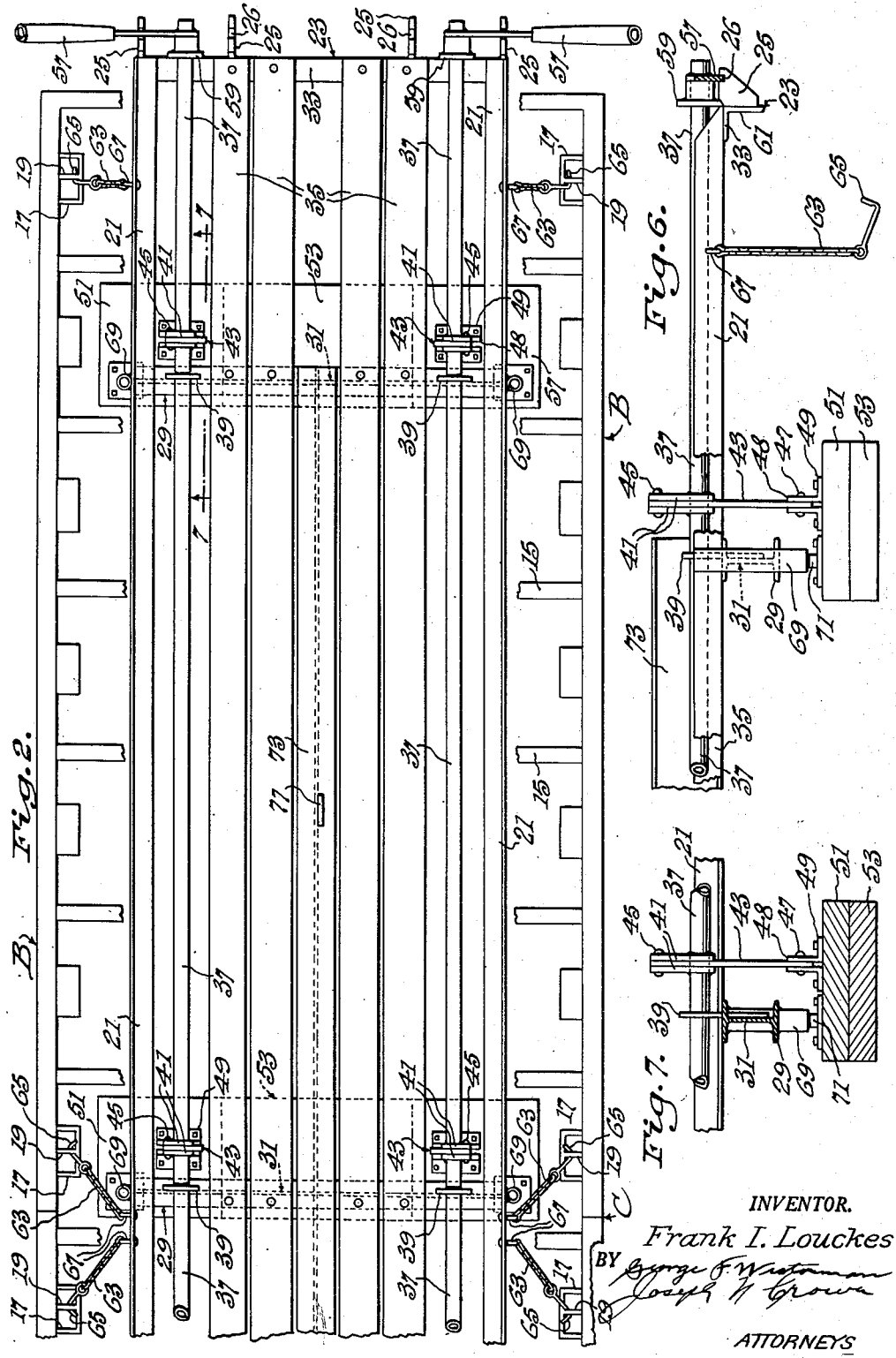

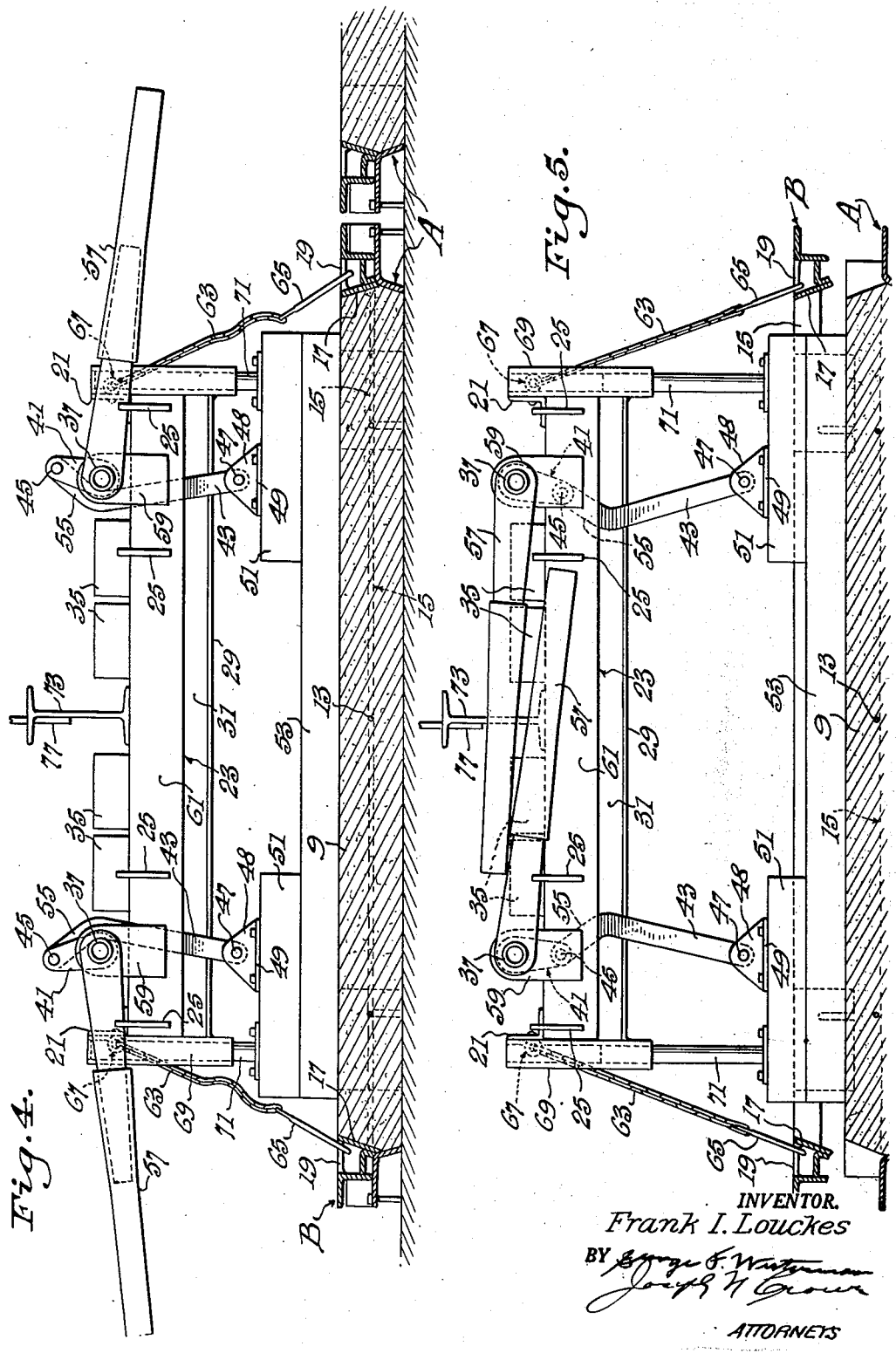

2,822,597

APPARATUS FOR MANIPULATING MOLD FORMS FOR MOLDING FLEXIBLE CONCRETE REVETMENT MATS

Frank I. Louckes, Memphis, Tenn.

Application July 24, 1956, Serial No. 599,888

4 Claims. (Cl. 25—1)

(Granted under Title 35, U. S. Code (1952), sec. 266)

The invention described herein may be manufactured and used by or for the Government for governmental purposes without the payment of any royalty thereon.

In United States Letters Patent No. 2,594,324, issued April 29, 1952, to Frank I. Louckes, there is described and claimed a mold assembly for casting uniform unit sections of an articulated revetment mat of the kind that are employed for the protection of shore lines, river banks, beaches, and the like, from erosion through the action of waves, currents, and other erosive effects.

As disclosed in the patent, such mold assembly comprises complemental top and bottom mold forms provided with means defining the individual slabs of the complete mat, and also for defining desired recesses in the slabs for enabling access of manipulative instrumentalities to the reinforcing cables embedded in the concrete composing the individual slabs for enabling removal of the completed revetment mat from the mold and transportation thereof to a storage station or to a launching site, and application of launching means to such cables for controlling the placement and launching of the revetment mat at the place of use.

As is indicated in the disclosure of the patent, the top mold frame is positioned on the bottom mold frame before the resulting mold assembly is filled with concrete, which, after assembling the said mold frames or forms, is poured therein until the respective slab-forms are filled with concrete. For removing the resulting molded revetment from the mold assembly, it is necessary that the concrete remain in the assembled mold until the concrete sets sufficiently to be self-sustaining, after which the top mold form is removed from the bottom mold form preparatory to lifting the finished revetment mat from the mold.

The present invention provides simple mechanical instrumentalities for placing and removing the top mold form or frame, mechanical handling thereof being a requisite owing to the size and weight of the form. The invention provides a form-lifting frame which is an apparatus for lifting mold forms vertically from concrete structures cast or molded in such forms, the apparatus being designed and constructed particularly for removing the molding forms from precast concrete V-type revetment mats.

The invention has for its principal object the provision of an apparatus constituting expeditious means of removing the above-referred to top form sections from V-type revetment mats while the concrete which has been cast in the forms is only partially set, and is still too soft to be walked upon.

Further objects of the invention will become apparent as the description proceeds, and the features of novelty will be pointed out in particularity in the appended claims.

The invention will be understood more readily by reference to the accompanying drawings, in which:

Fig. 1 is a perspective view of the improved lifting or form-handling equipment embodying the improvements of the present invention;

Fig. 2 is a fragmentary plan view of the lifting equipment of Fig. 1, showing it in operative position for lifting the top mold form from the revetment mat;

Fig. 3 is a fragmentary perspective view showing structural details of a portion of the equipment illustrated in Figs. 1 and 2;

Fig. 4 is an end view, partly in section, of the improved equipment, the view showing operating parts thereof in position for lifting the above-referred to top mold form;

Fig. 5 is a view similar to Fig. 4, but showing the parts shifted from the position of Fig. 4 into operated position with the top mold form raised from the bottom mold form;

Fig. 6 is a fragmentary side elevation of a lifting link or arm forming a part of the apparatus, together with associated parts, showing mounting details for such parts;

Fig. 7 is a fragmentary vertical section on the line 7—7 of Fig. 2, looking in the direction of the arrows; and Fig. 8 is a vertical sectional view through a fragment of the revetment mat.

As will be apparent from the above-referred to Louckes Patent No. 2,594,324, a complete unit section of an articulated revetment mat, which section also is termed in the art a revetment "mattress" and in practice is approximately 4' x 25' in surface dimensions and 3" thick, is cast or molded in steel forms divided by a horizontal plane into top and bottom form sections. The bottom form sections are arranged side by side with their longitudinal edges practically in contact with adjacent forms and permanently bolted to a base casting slab measuring in practice 25 feet wide by indefinite length depending upon the number of forms in use. The top form sections are removable, the present improved equipment being constructed and arranged for placing and removing such top form sections. In practice, both the top and bottom form sections are divided into three sub-sections 4' x 8'4" which, when assembled end on end, make up the full form lengths.

Referring more particularly to the accompanying drawings, which also may be considered in conjunction with the disclosure of the aforesaid Louckes patent, the permanently secured bottom mold form as indicated at A, which is surmounted by a complemental removable top mold form B comprising abutting subsections (three in number) as delineated by joint C, the bottom and top mold forms cooperating to produce individual concrete V-type revetment slabs 9 having oppositely directed V-shaped contacting surfaces 11, the individual slabs 9 being flexibly interconnected by cables 13 extending transversely through the individual slabs but longitudinally through a completely assembled revetment mattress. Both bottom and top mold forms are provided with similar lateral channel bars 15 while the top form B is provided with lateral scarf boxes 17, those of which on contiguous subsections and adjacent to each side of joints C having mounted therein lifting pins 19 engageable by lifting instrumentalities included in the improved apparatus of the present invention as will be described in detail hereinafter.

The improved lifting apparatus of the present invention which is constructed and arranged to lift simultaneously and to move the abutting subsections of the top mold form B, is made of a pick-up frame comprising side angle bars 21 and end angle bars 23, the latter having welded thereto a series of spaced outwardly projecting end brackets 25, each of which having similar top notches or recesses 26, and which are provided for a purpose hereinafter noted.

The angle bars 21 are interconnected rigidly by equally spaced transverse angle beams 29 having their webs 31 disposed vertically and welded to the side angle bars 21. The end bars 23 have their flanges 33 at the top of the end bars, these flanges 33 defining mounting means for spaced, parallel, continuously-extending wooden beams 35 which are bolted or equivalently secured to the flanges 33 of the said end bars 23, as well as to the transverse angle beams 29.

Intermediate each side bar 21 and its adjacent wooden beam 35 there is mounted an operating shaft 37, each shaft extending the length of the frame. Each shaft 37 is turnably mounted in similar bearing brackets 39 which in turn are mounted on the webs 31 of the transverse angle beams 29. Adjacent to each bearing bracket 39, there are mounted on each shaft 37 and turnable therewith eccentric crank means 41, which receive upper ends of connecting rods 43, pins 45 passing through the eccentric crank means 41 and the said upper ends of the connecting rods, forming pivotal connections between the upper ends of the connecting rods and the said eccentric crank means. The connecting rods 43 have their lower ends pivotally mounted as indicated at 47 between upstanding ears 48 of brackets 49 which, in turn, are secured to plates 51, each of which plates being bolted or equivalently secured to opposite ends of pallet members 53. These pallet members 53 are made of wood, and are designed to rest entirely on the hardening concrete in the mold forms but not anywhere in contact with the steel mold forms. The connecting rods 43 have bent portions 55 adjacent to their upper ends and contiguous to the operating shafts 37, in practice these bent upper end portions 55, which are connected to the eccentric cranks 41 being such that when the pallets 53 are lifted completely, the connections 45 are 15 degrees past center, and the bent connecting rods at their reinverted angles are against the shafts 37. In this position the eccentric mechanisms are completely locked for holding the pallets 53 in fully raised position.

Rotation of the shafts 37 is accomplished by levers 57 mounted on each of the shafts adjacent to the opposite ends thereof, end bearing brackets 59, similar to bearing brackets 39, being welded to the webs 61 of the end angle bars 23 of the lifting frame for receiving and mounting the ends of the respective shafts 37. The levers 57 together with their shafts 37 are turnable through an arc of approximately 180°, the levers 57 resting in top recesses 26 in the outermost end brackets 25, and when rotated into lifting position are received in the top recesses of intermediate end brackets 25, the said end brackets therefore being stops for terminating turning movements of levers 57 and shafts 37, for effecting suitable raising and lowering of the lifting frame relative to the top surface of the molded revetment mattress.

It will be seen also that the side angle bars 21 of the frame have secured to them chain cables 63 having free ends secured to lifting hooks 65, there being provided in practice six thereof on each side bar of the frame, there being a single chain and hook adjacent to each end of each side bar 21 and two pairs of hooks and chains intermediate these end hooks and chains, these hooks 65 being inserted around the lifting pins 19 in scarf boxes 17 on the top mold form B, the disposition of the said chains and hooks and of the lifting pins being such that contact of the hooks and pins is made at all four corners of each of the three subsections of the top mold form B, the disposition of the aforesaid chains and hooks being such that the distances between the points of connection 67 of the chains 63 and the side angle bars 21 of the frame are greater than the distances between the points of contact of the hooks 65 with the lifting pins 19 adjacent to each end of the contiguous subsections of the top mold form, this causing the chains attached to the hooks for each subsection of the top mold form B to pull against each other during lifting movement of the pick-up frame, thus keeping the ends of contiguous subsections in abutting engagement, which assures a safe non-slip attachment to the form B and also lifts the three sub-forms of the top mold form B as a single unit.

For assuring perpendicular motions of the pick-up frame with respect to the revetment concrete, guide cylinders 69 are welded to the side angles 21 and to the transverse beams 29 at the terminals thereof, in which cylinders pistons 71 are slidably mounted, the latter having their lower ends secured to plates 51 of pallet members 53, it being thereby evident that the cylinders 69 cooperate with the pistons 71 to cause the frame to be lifted and lowered always perpendicularly with respect to the concrete mattress.

For moving the pick-up frame between positions above and away from the mold form, an I-beam 73 is welded to the transverse beams 29, a drag line 75 being secured thereto through attaching lugs 77 welded to the I-beam 73, the dragline 75 being suspended from a hook 79 depending from a crane or other source of movement, not shown.

In operation, the subsections of the top mold form B are assembled on the bottom mold form A, with joints C between contiguous and abutting ends of successive subsections. The bottom and top mold forms then are filled with concrete, the top surface of which is struck off and finished, thereby molding the revetment mattress composed of flexibly interconnected V-type slabs 9. When the concrete has partially set so that vertical surfaces thereof will not slough when unsupported, the top form sections are removed. This period of setting requires in practice not more than 1½ hours. The pick-up frame of the improved equipment is placed on the comparatively green concrete. With the four pallets 53 resting on the concrete without touching the steel mold forms, the hooks 65 suspended from chains 63 are inserted in scarf boxes 17 and are hooked onto lifting pins 19 in such scarf boxes. The two levers 57 on shafts 37 are rotated inwardly through the aforesaid arc of about 180°, thereby correspondingly rotating the shafts 37 and causing the pallets 53 to press downwardly on the top surface of the concrete by pressure on the pallets through action of connecting rods 43, thus causing the pick-up frame to be jacked upwardly and lifting the top mold form B out of the concrete. The lifting of the mold form B then is completed by lifting on the dragline 75 by hook 79, the mold form B then being placed on the ground to one side of the hardening molded revetment mattress, which when hardened sufficiently, is lifted out of the permanently mounted bottom mold forms by suitable lifting equipment and transferred to storage until launched at a locale to be protected against erosion.

While the construction specifically described herein and illustrated in the accompanying drawings represents the preferred commercial embodiment of the invention, it will be apparent that this embodiment may be subject to specifically differing structural details as may become suggested to one skilled in the art without departing from the concept of the invention, and accordingly, it will be understood that it is intended and desired to embrace within the scope of the invention such modifications and changes as may be necessary or desired to adapt it to varying conditions and uses as defined by the appended claims.

Having thus described my invention, what I claim as new and wish to secure by Letters Patent is:

1. Apparatus for lifting top sections of mold forms employed for molding concrete revetment mats composed of reinforced concrete slabs, which comprises a frame defined by longitudinal side bars and end bars interconnecting the side bars, spaced pallet members depending from the frame adapted to engage concrete slabs hardening in the mold forms, operating shafts for vertically operating the pallet members, connecting rods interconnecting the pallet members and shafts, eccentric means on the shafts pivotally connecting the connecting rods to the shafts, levers on the shafts for rotating the said shafts, lifting devices spaced along the side bars of the frame adapted to engage lifting pins in lateral scarf boxes of the mold forms for lifting the mold forms relative to the slabs as the pallet members press against the slabs responsively to rotation of the operating shafts and resulting pressure of the pallet members against the slabs, operating the levers mounted on the operating shafts for enabling rotation of the shafts in clockwise and counterclockwise directions, selectively, and stop brackets extending outwardly from the end bars of the frame and provided with top recesses for receiving and holding the operating levers at the ends of operative rotations thereof in either selected direction.

2. Apparatus for lifting top sections of mold forms employed for molding concrete revetment mats composed of reinforced concrete slabs, which comprises a frame defined by longitudinal side bars and end bars transversely interconnecting the side bars, spaced pallet members depending from the frame transversely thereof adapted to engage revetment slabs hardening in the mold forms, longitudinally extending operating shafts mounted on the frame for operating the pallet members, connecting rods interconnecting the pallet members and shafts, levers on the shafts for turning the shafts in clockwise and counterclockwise directions, selectively, eccentric crank means on the shafts pivotally receiving the connecting rods, the said rods having upper angularly off-set portions pivotally connected to the crank means for selectively raising and lowering the pallet members responsively to corresponding rotation of the shafts, flexible spaced lifting means spacedly secured to the side bars of the frame terminating in a free end having hook means thereon for engaging lifting pins in lateral scarf boxes of the mold forms for lifting the mold forms relative to the slabs as the pallet members become pressed against the slabs, and operating levers mounted on the shafts for enabling rotation of the shafts in opposite directions, selectively.

3. Apparatus for lifting top sections of mold forms for molding concrete revetments composed of reinforced concrete slabs, which comprises a frame having longitudinal side bars and end bars transversely interconnecting the side bars, additional spaced transverse bars intermediate the end bars and secured to the longitudinal side bars of the frame, spaced pallet members adjacent to the transverse bars depending from the frame transversely thereof adapted to engage revetment slabs hardening in the mold forms, longitudinally-extending operating shafts mounted on the frame for operating the pallet members, vertically disposed connecting rods interconnecting the pallet members and shafts, levers mounted on the shafts for turning the shafts in opposite directions, connecting rods secured to the pallet members for vertically operating the pallet members responsively to operation of the shafts, eccentric crank members mounted on the shafts pivotally receiving the connecting rods, the said connecting rods having upper outwardly bent end portions connected to the said crank members for vertically moving the pallet members responsively to selected turning movements of the shafts, flexible lifting means connected to the side bars of the frame adjacent to the transverse bars and having free ends having lifting hook means connected thereto for engaging lifting pins in lateral scarf boxes of the mold form for lifting the mold form relatives to the slabs as the pallet members become pressed against the slabs, lever means on the shafts for oppositely rotating the shafts, and guide means mounted on the transverse frame beams and connected to the pallet members for perpendicularly guiding movements of the pallet members with respect to the slabs in the mold forms.

4. Lifting apparatus as claimed in claim 3 wherein the guide means for the pallets include vertical guide cylinders mounted on the transverse beams and a piston operable in each guide cylinder connected to the pallet members for guiding the latter in vertical movements responsively to actuation of the connecting rods by rotation of the operating shafts.

References Cited in the file of this patent

UNITED STATES PATENTS

| | | |
|---|---|---|
| 1,093,242 | Barten | Apr. 14, 1914 |
| 2,269,557 | Sexton | June 13, 1942 |
| 2,614,309 | Price | Oct. 21, 1952 |

FOREIGN PATENTS

| | | |
|---|---|---|
| 507,557 | France | June 26, 1920 |